United States Patent [19]

Pecoraro et al.

[11] Patent Number: 4,795,731

[45] Date of Patent: Jan. 3, 1989

[54] TRANSITION METAL SULFIDE PROMOTED MOLYBDENUM OR TUNGSTEN SULFIDE CATALYSTS AND THEIR USES FOR HYDROPROCESSING

[75] Inventors: Theresa A. Pecoraro, Danville, Calif.; Allan Jacobson, Princeton; Russell R. Chianelli, Somerville, both of N.J.

[73] Assignee: Exxon Research and Engineering Company, Florham Park, N.J.

[21] Appl. No.: 123,565

[22] Filed: Nov. 19, 1987

Related U.S. Application Data

[63] Continuation of Ser. No. 902,480, Sep. 2, 1986, abandoned, which is a continuation of Ser. No. 687,535, Dec. 28, 1984, Pat. No. 4,650,563, which is a continuation-in-part of Ser. No. 595,908, Apr. 2, 1984, abandoned, which is a continuation of Ser. No. 454,383, Dec. 29, 1982, abandoned.

[51] Int. Cl.$^4$ .................... B01J 27/051; B01J 27/049; B01J 27/047; B01J 31/18
[52] U.S. Cl. ........................... 502/221; 502/167; 502/219; 502/220
[58] Field of Search ............... 423/561 R, 561 B, 562; 502/154, 164, 167, 219, 220, 221

[56] References Cited

U.S. PATENT DOCUMENTS

| | | | |
|---|---|---|---|
| 4,430,442 | 2/1984 | Sawyer et al. | 502/220 |
| 4,430,443 | 2/1984 | Seiver et al. | 502/164 |
| 4,431,747 | 2/1984 | Seiver et al. | 502/220 |
| 4,510,260 | 4/1985 | Steifel et al. | 502/219 |
| 4,560,470 | 12/1985 | McCarty et al. | 502/220 |
| 4,632,747 | 12/1986 | Ho et al. | 502/219 |

*Primary Examiner*—Paul E. Konopka
*Attorney, Agent, or Firm*—Edward M. Corcoran; Joseph J. Dvorak

[57] ABSTRACT

Hydrocarbon feeds are upgraded by contacting a feed, at elevated temperature and in the presence of hydrogen, with a self-promoted catalyst prepared by heating one or more catalyst precursors under oxygen-free conditions in the presence of sulfur at a temperature of at least about 150° C. The catalyst precursors will be one or more compounds of the formula (ML) (Mo$_y$W$_{1-y}$S$_4$) wherein M comprises one or more divalent promoter metals selected from the group consisting of Ni, Co, Zn, Cu and mixtures thereof, wherein y is any value ranging from 0 to 1 and wherein L is one or more neutral, nitrogen-containing ligands at least one of which is a chelating, polydentate ligand.

15 Claims, No Drawings

TRANSITION METAL SULFIDE PROMOTED MOLYBDENUM OR TUNGSTEN SULFIDE CATALYSTS AND THEIR USES FOR HYDROPROCESSING

CROSS-REFERENCE TO RELATED APPLICATIONS

This is a Rule 60 continuation application based on U.S. Ser. No. 902,480, filed Sept. 2, 1986, now abandoned, which is a Rule 60 continuation of U.S. Ser. No. 687,535, filed Dec. 28, 1984, now U.S. Pat. No. 4,650,563 which is a continuation-in-part of U.S. Ser. No. 595,908, filed Apr. 2, 1984, now abandoned, which is a Rule 60 continuation of U.S. Ser. No. 454,383, filed Dec. 29, 1982 and now abandoned.

BACKGROUND OF THE INVENTION

1. Field of the Invention

This invention relates to a process for preparing transition metal sulfide promoted molybdenum and tungsten sulfide catalysts, the catalyst species prepared by such process, and to the use of such catalyst species for hydroprocessing processes, particularly hydrotreating. More particularly, this invention relates to the preparation and use of catalysts useful for hydroprocessing processes, such as hydrotreating, wherein said catalysts are formed by heating, at elevated temperature, in the presence of sulfur and under oxygen-free conditions, one or more catalyst precursor salts containing a thiometallate anion of Mo, W or mixture thereof and a cation comprising one or more promotor metals which are chelated by at least one neutral, nitrogen-containing polydentate ligand, said promoter metal being selected from the group consisting of Ni, Co, Zn, Cu and mixture thereof.

2. Background of the Disclosure

The petroleum industry is increasingly turning to coal, tar sands, heavy crudes and resids as sources for future feedstocks. Feedstocks derived from these heavy materials contain more sulfur and nitrogen than feedstocks derived from more conventional crude oils. Such feedstocks are commonly referred to as being dirty feeds. These feeds therefore require a considerable amount of upgrading in order to obtain usable products therefrom, such upgrading or refining generally being accomplished by hydrotreating processes which are wellknown in the petroleum industry.

These processes require the treating with hydrogen of various hydrocarbon fractions, or whole heavy feeds, or feedstocks, in the presence of hydrotreating catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrotreating relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrotreating. Carbon yield is reduced, and gasoline yield is generally increased. In the hydrodesulfurization of heavier feedstocks, or residua, the sulfur compounds are hydrotreating and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residua, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodenitrogenation of relatively heavy feedstocks, emphasis is on the removal of sulfur from the feedstock. In the hydrodenitrogenation of relatively heavy feedstocks emphasis is on the removal of nitrogen from the feedstock. Albeit, although hydrodesulfurization and hydrodenitrogenation reactions generally occur together, it is usually far more difficult to achieve effective hydrodenitrogenation of feedstocks than hydrodesulfurization of feedstocks.

Catalysts most commonly used for these hydrotreating reactions include materials such as cobalt molybdate on alumina, nickel on alumina, cobalt molybdate promoted with nickel, nickel tungstate, etc. Also, it is wellknown to those skilled in the art to use certain transition metal sulfides such as cobalt and molybdenum sulfides and mixtures thereof to upgrade oils containing sulfur and nitrogen compounds by catalytically removing such compounds in the presence of hydrogen, which processes are collectively known as hydrotreating or hydrorefining processes, it being understood that hydrorefining also includes some hydrogenation of aromatic and unsaturated aliphatic hydrocarbons. Thus, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogencontaining hydrocarbon oils. U.S. Pat. No. 2,715,603, discloses the use of molybdenum sulfide as a catalyst for the hydrogenationn of heavy oils, while U.S. Pat. No. 3,074,783 discloses the use of molybdenum sulfides for producing sulfur-free hydrogen and carbon dioxide, wherein the molybdenum sulfide converts carbonyl sulfide to hydrogen sulfide. Molybdenum and tungsten sulfides have other uses as catalysts, including hydrogenation, methanation, water gas shift, etc. reactions.

In general, with molybdenum and other transition metal sulfide catalysts as well as with other types of catalysts, higher catalyst surface areas generally result in more active catalysts than similar catalysts with lower surface areas. Thus, those skilled in the art are constantly trying to achieve catalysts that have higher surface areas. More recently, it has been disclosed in U.S. Pat. Nos. 4,243,553, and 4,243,554 that molybdenum sulfide catalysts of relatively high surface area may be obtained by thermally decomposing selected thiomolybdate salts at temperatures ranging from 300°–800°C. in the presence of essentially inert, oxygen-free atmospheres. Suitable atmospheres are disclosed as consisting of argon, a vacuum, nitrogen and hydrogen. In U.S. Pat. No. 4,243,554 an ammonium thiomolybdate salt is decomposed at a rate in excess of 15° C. per minute, whereas in U.S. Pat. No. 4,243,553, a substituted ammonium thiomolybdate salt is thermally decomposed at a very slow heating rate of from about 0.5 to 2°C./min. The processes disclosed in these patents are claimed to produce molybdenum disulfide catalysts having superior properties for water gas shift and methanation reactions and for catalyzed hydrogenation or hydrotreating reactions.

SUMMARY OF THE INVENTION

This invention relates to a process for the preparation of self-promoted molybdenum and tungsten sulfide catalysts, the catalysts prepared by such process and to the use of such catlaysts for hydroprocessing processes, particularly hydrotreating. More particularly, this invention relates to the preparation and use of catalysts useful for hydroprocessing processes such as hydrotreating wherein said catalysts are formed by heating, at elevated temperature, in the presence of sulfur and under oxygen-free conditions, one or more precursor salts containing a thiometallate anion of Mo, W or mixture thereof and a cation comprising one or more promotor metals which are chelated by at least one neutral, nitrogen-containing polydentate ligand, wherein said promoter metal is selected from the group consisting of Ni, Co, Zn, Cu and mixture thereof. With the possible exception of Co which can be either divalent or trivalent, the chelated promoter metal in the cation will be in the divalent state. However, for all practical purposes, all of the promoter metals in the precursor salt, including Co, will be in the divalent state.

These precursor salts are of the formula (ML)$(Mo_yW_{1-y}S_4)$ wherein M is one or more divalent promoter metals selected from the group consisting of Ni, Co, Zn, Cu and mixtures thereof, wherein y is any value ranging from 0 to 1, and wherein L is one or more, neutral, nitrogen-containing ligands at least one of which is a chelating polydentate ligand. In a preferred embodiment M will be selected from the group consisting of Co, Ni and mixtures thereof. In a particularly preferred embodiment ligand L will have a denticity of six and will be either three bidentate or two tridentate chelating ligands.

Hydroprocessing processes is meant to include any process that is carried out in the presence of hydrogen including, but not limited to, hydrocracking, hydrodenitrogenation, hydrodesulfurization, hydrogenation of aromatic and unsaturated hydrocarbons, methanation, water gas shift, etc. These reactions include hydrotreating and hydrorefining reactions, the difference generally being thought of as more of a difference in degree than in kind, with hydrotreating conditions being more severe than hydrorefining conditions. Some of the catalysts of this invention have been found to have hydrotreating or hydrorefining activitites substantially greater than those of catalysts derived from conventional hydrotreating catalyst precursors such as cobalt molybdate on alumina, even though their surface areas are not as high.

Thus, in the context of this invention, hydroprocessing processes comprises contacting a hydrocarbon feed, at elevated temperature and in the presence of hydrogen, with a self promoted catalyst obtained by heating one or more catalyst precursor salts of the formula (ML) $(Mo_yW_{1-y}S_4)$ in a non-oxidizing atmosphere in the presence of sulfur at a temperature of at least about 150° C. for a time sufficient to form said catalyst, wherein M is one or more divalent promoter metals selected from the group consisting essentially of Co, Ni, Cu, Zn and mixtures thereof.

DETAILED DESCRIPTION OF THE INVENTION

The precise nature and composition of the catalyst species that is formed as a result of heating one or more precursor salts in the presence of sulfur and under oxygen-free conditions is not known. Further, the bulk, unsupported catalyst species of this invention are believed to be related to supported catalyst species defined in U.S. patent application Ser. No. 687,535 jointly filed by T. C. Ho, R. R. Chianelli, A. J. Jacobsen, and A. R. Young on even date herewith. Thus, the supported catalyst species of Jacobson et al, are formed by heating a composite of one or more of the precursor salts disclosed in this application with one or more suitable support materials in the presence of sulfur and under oxygen-free conditions.

As hereinbefore stated, the catalyst precursor slat will have the formula (ML) $(Mo_yW_{1-y}S_4)$ wherein M is one or more divalent promoter metals selected from the group consisting of Ni, Co, Zn, Cu and mixtures thereof. Preferably M will be selected from the group consisting of (a) divalent Ni, Co and mixtures thereof and (b) mixtures of (a) with divalent Zn, Cu and mixtures thereof. Still more preferably M will be selected from the group consisting of divalent Ni, Co and mixtures thereof. Thus, the divalent promoter metal may be a single metal such as Ni in which case the precursor would have the formula (NiL) $(Mo_yW_{1-y}S_4)$. Alternatively the promoter metal may be a mixture of two, three or even four promoter metals. For the case of two promoter metals, such as Ni and Co, the precursor would have the formula $[(Ni_aCo_{1-a})L](Mo_yW_{1-y}S_4)$ wherein $0<a<1$. In the case of three promoter metals such as Ni, Co and Zn, the precursor would have the formula of the form $[(Ni_aCo_bZn_c)L](Mo_yW_{1-y}S_4)$ wherein $0<a$, b or $c<1$ and $a+b+c=1$. Where there are four metals such as Cu, Ni, Co and Zn, the precursor will have the formula $[(Cu_aNi_bCo_cZn_d)L](Mo_yW_{1-y}S_4)$ wherein $0<$ a, b, c, or $d<1$ and $a+b+c+d=1$. The precursor may be a self promoted thiomolybdate, thiotungstate or combination thereof. If it is only a thiomolybdate it is obvious that y will have a value of 1. Alternatively, if the precursor is a thiotungstate y will be zero.

The ligand or ligands L, will generally have a denticity of six and will be one or more neutral, nitrogen containing ligands wherein at least one of said ligands is a multidentate chelating ligand which chelates the promoter metal cation to form a chelated promoter metal $[ML]^{2+}$. Thus, the catalytic metal sulfide anion $(Mo_yW_{1-y}S_4)^{2-}$ will be ionically bound to the chelated promoter metal cation $[ML]^{2+}$. By neutral is meant that the ligand itself does not have a charge.

If desired, more molybdenum and/or tungsten sulfide may be incorporated into the catalyst composition than is permitted by the stoichiometric amount present in the (ML) $(Mo_yW_{1-y}S_4)$ precursor salt, by mixing said precursor salt with one or more thiometallate salts of the general formula (L') $(Mo_yW_{1-y}S_4)$. In the formula (L') $(Mo_yW_{1-y}S_4)$, L' is the conjugate acid of one or more ligands, L, with a charge sufficient to balance the dinegative charge of the thiometallate anion. In its conjugate acid form the ligand forms a cation $[L']^{2+}$ which is ionically bound to the thiometallate anion. For example, if L is ethylenediamine (en), L' will be [H$_2$en] and the corresponding thiomolybdate salt, for example, will be [H$_2$en](MoS$_4$). For diethylene triamine, (dien), the corresponding salt will be [H$_2$ dien](MoS$_4$). These salts, (L') (Mo$_y$W$_{1-y}$S$_4$) may be prepared, for example, by dissolving ammonium thiometallate in excess of ligand or ligands L. The salt may then be recovered by addition of water or some other suitable antisolvent such as methanol or acetone.

Those skilled in the art know that the term "ligand" is used to designate functional coordinating groups which have one or more pairs of electrons available for the formation of coordinate bonds. Ligands that can form more than one bond with a metal ion are called polydentate while ligands that can form only one bond with a metal ion are called monodentate. Monodentate ligands are not capable of forming chelates. Hence, if one uses one or more species of monodentate ligands in the precursor molecule, then one must also use at least one polydentate chelating ligand. Preferably L will be one or more polydentate chelating ligands. The denticity of the ligand C will generally be six, because the promoter metal cations prefer six-fold coordination. Hence, if more than one species of ligand is employed in the precursor molecule, the denticity of the ligand species will usually add up to six. It should be understood that it is possible for ligand L to have a total denticity of less than six, but in most cases L will have a total denticity of six. Thus, L will be three bidentate ligands, two tridentate ligands, a mixture of a bidentate and a quadridentate ligand, a hexadentate ligand or a mixture of a polydentate ligand with monodentate ligands as long as the combination has a total denticity of six. As has heretofore been stated, it is preferred to use chelating bidentate and tridentate ligands. In general, the ligands useful in this invention include alkyl and aryl amines and nitrogen heteroxycles. Illustrative but non-limiting examples of ligands useful in the catalyst precursors of this invention are set forth below.

Monodentate ligands will include NH$_3$ as well as alkyl and aryl amines such as ethyl amine, dimethyl amine, pyridine, etc. Useful chelating bidentate amine ligands are illustrated by ethylenediamine, 2,2'-bipyridine, o-phenylene diamine, tetramethylethylenediamine and propane-1,3 diamine. Similarly, useful chelating tridentate amine ligands are represented by terpyridine and diethylenetriamine while triethylenetetramine is illustrative of a useful chelating quadridentate amine ligands. Useful chelating pentadentate ligands include tetraethylenepentamine while sepulchrate (an octazacryptate) is illustrative of a suitable chelating hexadentate ligand. However, as a practical matter it will be preferred to use chelating, polydentate alkyl amines for L. Illustrative, but not limiting examples of alkyl amines that are useful in the catalyst precursor of this invention include ethylenediamine, diethylenetriamine, and tetraethylenetetramine. It is particularly preferred to use bidentate and tridentate alkyl amines such as ethylenediamine, (en) and diethyleneriamine, (dien).

Many of the precursor salts useful in forming the catalysts of this invention and methods for preparing them are known in the art, although it has not heretofore been known that such salts can be useful catalyst precursors. An article by Diemann and Mueller titled Thio and Seleno Compounds of the Transition Metals With d$^o$ Configuration published in COORD. CHEM. REV. 10:79-122 provides a review of known salts. In general, the precursor salts useful for forming the catalysts of this invention may be prepared by mixing an aqueous solution of ammonium thiomolybdate and/or thiotungstate with an aqueous solution of the chelated promoter metal cation [ML]$^{2+}$ which results in the formation of the precursor salt as a precipitate which is readily recovered. The chelating promoter cation is easily formed by, for example, mixing an aqueous solution of one or more water soluble promoter metal salts with the ligand or mixture of ligands. The water soluble salt may be any water soluble salt that is convenient to use such as a halide, sulfate, perchlorate, acetate, nitrate, etc. Alternatively, an aqueous solution of ammonium thiomolybdate and/or tungstate may be mixed with the ligand with the resulting solution mixed with an aqueous solution of promoter metal salt or the salt can be added to the ligand and dissolved into the solution of thiomolybdate and/or thiotungstate. The catalyst precursor preparation will be further understood by reference to the Examples, infra. However, it should be understood that the catalyst precursor preparation is not intended to be limited to aqueous media.

The catalysts of this invention may be prepared by heating one or more catalyst precursor salts, in the presence of sulfur in an oxygen-free atmosphere or environment, at a temperature of at least about 150° C., preferably at least about 200° C. for a time sufficient to form the catalyst. The sulfur required during the formation of the catalyst may be that which is present in the precursor salt in which case the expression "in the presence of sulfur" means that sulfur is present in the precursor salt. Thus, it has been found that catalyst compositions of this invention will be formed if no excess sulfur is present and if the oxygen-free atmosphere is relatively inert, such as nitrogen. In some cases, however, it is preferred that the sulfur will be present in an amount in excess of that contained in the precursor salt. In some cases, however, it is preferred that the catalyst be formed by heating the precursor in the presence of excess sulfur, it is also preferredthat the excess sulfur be present in the form of a sulfur bearing compound which can be one or more solids, liquids, gases or mixtures thereof. Mixtures of hydrogen and H$_2$S have been found to be particularly suitable. In general the temperature will range between from about 200°–600° C., preferably from about 250°–600° C., more preferably from about 250°–500° C. and still more preferably from about 300°–400° C. The non-oxiding atmosphere may be gaseous, liquid or mixture thereof.

As discussed under Background of the Disclosure, molybdenum and tungsten sulfide catalysts have many uses, including hydrotreating. Hydrotreating conditions vary considerably depending on the nature of the hydrocarbon being treated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within a range of from about 325° C. to about 475° C., a lube oil feed boiling within a range of from about 290° to 550° C. or a residuum containing from about 10 percent to about 50 percent of a material boiling above about 575° C.

| Feed | Temp., °C. | Pressure psig | Space Velocity V/V/Hr | Hydrogen Gas Rate SCF/B |
|---|---|---|---|---|
| Naphtha | 100–370 | 150–800 | 0.5–10 | 100–2000 |
| Diesel | 200–400 | 250–1500 | 0.5–6 | 500–6000 |

-continued

| Feed | Temp., °C. | Pressure psig | Space Velocity V/V/Hr | Hydrogen Gas Rate SCF/B |
|---|---|---|---|---|
| Fuel | | | | |
| Heavy Gas Oil | 260–430 | 250–2500 | 0.3–4 | 1000–6000 |
| Lube Oil | 200–450 | 100–3000 | 0.2–5 | 100–10,000 |
| Residuum | 340–450 | 1000–5000 | 0.1–2 | 2000–10,000 |

It should be noted that the compositions of this invention are useful catalysts for lube oil refinery processes where it is desirable to remove oxidation initiating nitrogen compounds from lube oil feeds.

The invention will be further understood by reference to the following examples.

EXAMPLES

Catalyst Precursor Preparation

A nickel ethylenediamine thiomolybdate Ni(en)$_3$MoS$_4$ precursor was prepared by dissolving ammonium thiomolybdate into ethylenediamine (en) and cooling the resulting dark red solution to 0° C. in an ice bath. An aqueous solution of nickel chloride was slowly added, in aliquots, to the dark red solution, with agitation after the addition of each aliquot. An orange precipitate was formed and recovered by vacuum filtration. This precipitate was Ni(en)$_3$MoS$_4$ and was washed with distilled water and ethanol and then dried in a vacuum oven at 50° C. for three hours. More specifically, 5.4 gm of (NH$_4$)$_2$MoS$_4$ was added to 25 ml of ethylenediamine (en) in a 250 ml Erlenmeyer flask. Distilled H$_2$O was used twice to wash off any solid or solution remaining on the sides of the flask. The resulting dark red solution was cooled to 0° C. in an ice bath and kept in the bath for the duration of the preparation. In a separate flask 5 gm of NiCl$_2$.6H$_2$O were dissolved into 20 ml of distilled H$_2$O. This Ni$^{2+}$ solution was added slowly, in aliquots, to the (NH$_4$)$_2$MoS$_4$/en aqueous solution with agitation after each addition. An orange ppt. formed immediately. Distilled H$_2$O was added to increase the volume of the reaction mixture. This mixture was allowed to stand in the ice bath for at least 5 min. after the reaction was completed. The ppt. was separated out by vacuum filtration through a Buchner funnel. The product, Ni(en)$_3$MoS$_4$, was washed with distilled H$_2$O, then with ethanol, and dried under vacuum for 16–24 hrs. 9.4 gm of Ni(en)$_3$MoS$_4$ were recovered.

This same procedure was used for the preparation of Co(en)$_3$MoS$_4$ and precursors containing other promoter metals, except that an appropriate amount of CoCl$_2$.6H$_2$O or the chloride of the particular promoter metal was used instead of NiCl$_2$.6H$_2$O. Similarly, when mixtures of promoter metals were used, their chloride salts were used to make the precursor.

In all cases the resulting catalyst precursor powder was screened, pelletized and sized to 20/40 mesh (Tyler).

EXAMPLES 1–3

In these examples a number of different catalysts were prepared by heating a number of different, promoted precursors such as nickel trisethylenediamine thiomolybdate Ni(en)$_3$MoS$_4$, in a mixture of H$_2$/H$_2$S (15% H$_2$S) at 375° C. for two hours. A catalyst formed by heating ammonium thiomolybdate (NH$_4$)$_2$MoS$_4$ [prepared by the method of S. J. Tauster et al. described in J. of Cat. 63, 515 (1980)], in the H$_2$/H$_2$S mixture was used as a control. The resulting black solids were pressed into pellets under 15,000–20,000 psi and then meshed through 10/20 mesh or 20/40 mesh sieves. One gram of this meshed catalyst was mixed with 10 g of 1/16- in. spheroid porcelain beads and placed in the catalyst basket of a Carberry-type autoclave reactor. The remainder of the basket was filled with more beads. The reactor was designed to allow a constant flow of hydrogen through the feed and to permit liquid sampling during operation.

After the catalyst and beads were charged to the reactor, the reactor system was flushed with helium for about 30 minutes after which hydrogen flow through the reactor was initiated at a rate of 100 STD cc/min. After the hydrogen began flowing through the reactor, the reactor was charged with 100 cc of a feed comprising a DBT/decalin mixture which was prepared by dissolving 4.4 g of dibenzothiophene (DBT) in 100 cc of hot decalin. The solution thus contained about 5 wt. % DBT or 0.8 wt. % S. The hot feed solution was filtered and 1 cc of decane was added.

After the feed was charged to the reactor, the hydrogen pressure was increased to about 450 psig and the temperature in the reactor raised from room temperature to about 350° C. over a period of about ½ hour. The hydrogen flow rate through the reactor was maintained at about 100 STD cc per minute. When the desired temperature and pressure were reached, a GC sample of liquid was taken and additional samples taken at one hour intervals thereafter. The liquid samples from the reactor were analyzed using a Gas Chromatograph.

As the reaction progressed, samples of liquid were withdrawn once an hour and analyzed by gas chromatography in order to determine the activity of the catalyst towards hydrodesulfurization. The hydrodesulfurization activity was determined according to the following model reaction:

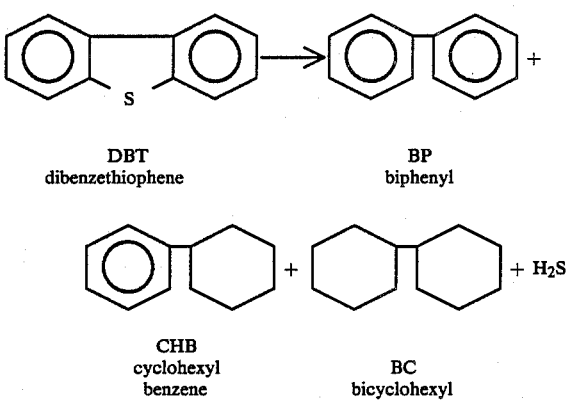

DBT
dibenzethiophene

BP
biphenyl

CHB
cyclohexyl
benzene

BC
bicyclohexyl

The hydrodesulfurization activity or zero order rate constant, k, for the nickel promoted catalyst was found to be 137×10$^{16}$ molecules of DBT desulfurized per gram of catalyst per second. This activity was determined at a DBT conversion level ≦50%. The results are summarized in Table I.

The above experiment was repeated with cobalt and zinc trisethylenediamine thiomolybdate catalyst precursors, the results of which are also summarized in Table I.

These results show that cobalt and nickel had the greatest HDS activity of the promoted MoS$_2$ catalysts. These results also show that HDS activity does not correlate with catalyst surface area.

TABLE I

HDS Activity in DBT/Decalin at 350° C.

| Example No. | Catalyst Precursor | HDS rate constant k, per gm. of catalyst per sec. × 10$^{16}$ | BET Catalyst Surface area, m$^2$/gm |
|---|---|---|---|
| Control | (NH$_4$)$_2$MoS$_4$ | 36 | 108 |
| 1 | Ni(en)$_3$MoS$_4$ | 137 | 18 |
| 2 | Zn(en)$_3$MoS$_4$ | 17 | 13 |
| 3 | Co(en)$_3$MoS$_4$ | 109 | 19 |

EXAMPLES 4-7

This experiment was similar to that of Examples 1-3, except that the catalyst precursor in all cases was nickel trisethylenediamine thiomolybdate which was decomposed at various temperatures for a period of two hours in an H$_2$/15% H$_2$S mixture to produce the nickel promoted molybdenum sulfide catalysts. The data in Table 2 show the effect of a formation temperature for the catalyst HDS activity in the DBT/Decalin feed under the specific reaction conditions.

TABLE 2

Effect of Temp. on HDS Activity for Catalyst formed from Ni(en)$_3$MoS$_4$

| Example | Formation Temperature, °C. | HDS rate constant, k × 10$^{16}$ |
|---|---|---|
| 4 | 275 | 141 |
| 5 | 325 | 153 |
| 6 | 375 | 107 |
| 7 | 425 | 73 |

EXAMPLES 8 and 9

This experiment was also similar to that of Examples 1-3, using a nickel trisethylenediamine thiomolybdate catalyst precursor, except that the catalyst was formed by heating the precursor in either hydrogen or DBT/Decalin and not in the H$_2$/H$_2$S mixture. The data are contained in Table 3 and date show that the catalyst was formed in hydrogen or in a sulfur-containing hydrocarbon.

TABLE 3

Effect of Formation Atmosphere

| Example | Formation Atmosphere | HDS rate constant, k × 10$^{16}$ |
|---|---|---|
| 8 | H$_2$ | 78 |
| 9 | DBT/Decalin | 95 |

EXAMPLES 10-15

This experiment was similar to that of Examples 1-3, except that the catalyst precursor was Ni$_x$Zn$_{1-x}$(en)$_3$MoS$_4$. The results are listed in Table 4 and show that one can substantially reduce the amount of nickel without a corresponding reduction in HDS activity.

TABLE 4

Effect of Two Promoter Metals

| Example # | Nickel and Zinc Content of Catalyst Precursor | HDS Rate Constant, k × 10$^{16}$ | BET Surface area, M$^2$/gm |
|---|---|---|---|
| 10 | Ni$_{0.05}$Zn$_{0.95}$ | 27 | 31 |
| 11 | Ni$_{0.10}$Zn$_{0.90}$ | 81 | 25 |
| 12 | Ni$_{0.20}$Zn$_{0.80}$ | 83 | 62 |
| 13 | Ni$_{0.30}$Zn$_{0.70}$ | 117 | 32 |
| 14 | Ni$_{0.40}$Zn$_{0.60}$ | 104 | 36 |
| 15 | Ni$_{0.70}$Zn$_{0.30}$ | 87 | 22 |

EXAMPLES 16-19

These experiments were similar to those in Examples 1-3 and demonstrate the requirement of using a chelating nitrogen containing neutral ligand to complex the promoter metal cation to form the catalysts of this invention. In this experiment, the Ni(NH$_3$)$_6$MoS$_4$ was prepared by adding an aqueous solution of Ni(NH$_3$)$_6$Cl$_2$ to an aqueous solution of (NH$_4$)$_2$MoS$_4$. The others were prepared by adding an aqueous solution of the promoter metal chloride to an aqueous (NH$_4$)$_2$MoS$_4$ solution. In all cases a precursor precipitate was formed and treated as in Examples 1-3. Comparing the results of this experiment which are set forth in Table 5 with those in Table 1 show a significant difference in HDS activity, particularly with the nickel and cobalt promoted catalysts, between the catalysts of this invention and MoS$_4$ catalysts promoted by conventional means. It is also significant to note that the ppt. Co/MoS$_4$ catalyst has a surface area of over three times that of the catalyst made from Co(en)$_3$MoS$_4$ and its HDS activity is less than one third of the cobalt promoted catalyst of this invention.

TABLE 5

Organic Amine in Necessary for High Activity

| Example | Precursor | HDS Rate Constant k × 10$^{16}$ | BET Surface Area M$^2$/gm |
|---|---|---|---|
| 16 | Ni(NH$_3$)$_6$MoS$_4$ | 32 | 16.4 |
| 17 | ppt Ni/MoS$_4$ | 27 | 14.8 |
| 18 | ppt Co/MoS$_4$ | 34 | 68.8 |
| 19 | ppt Zn/MoS$_4$ | 14 | — |

EXAMPLES 20-24

Catalyst Preparation

The catalyst precursors were prepared as per Examples 1-3. For these experiments the catalyst precursors were pelletized using a 4% aqueous solution of polyvinyl alcohol and were placed into a stainless steel reactor at 100° C. at atmospheric pressure where they were purged for one hour under nitrogen. Ten percent of hydrogen sulfide in hydrogen was introduced into the reactor at a space velocity of 0.75 SCF/hr for each 10cc of catalyst in the reactor. The temperature in the reactor was then raised to 325° C. and kept at this temperature for three hours to form the catalyst after which the temperature in the reactor was lowered to 100° C., the H$_2$S/H$_2$ gas flow was stopped and the reactor was purged with nitrogen until room temperature was reached.

Reaction Conditions

The catalysts were loaded into a fixed-bed, stainless steel reactor. The conditions in the reactor were as set forth below:

| | |
|---|---|
| Temperature | 325° C. |
| Pressure | 3.15 MPa |
| Hydrogen rate | 3000 SCF/bbl |
| LHSV | 1.5–6.0 V/V/Hr. |

The liquid product was analyzed for total sulfur by X-ray fluorescence and for nitrogen by combustion analysis. The feedstock used was a light catalytic cycle oil (LCCO) that was about 20 wt. % paraffinic having properties set forth in Table 6.

In all of these experiments, the results obtained from the catalysts of this invention were compared to results obtained from a commercial hydrotreating catalyst comprising cobalt molybdate on $\gamma$-Al$_2$O$_3$ and nickel molybdate on $\gamma$-alumina. The cobalt molybdate catalyst contained 12.5 percent molybdenum oxide and 3.5 percent cobalt oxide supported on the gamma alumina and the nickel molybdate contained 18% molybdenum oxide and 3.5% nickel oxide on gamma alumina. These commercial catalysts were sulfided employing the same procedure used to form the catalysts of this invention, except that the temperature was 360° C. for one hour.

Experimental Runs

In these experiments a number of runs were made using the self-promoted catalysts of this invention and the LCCO feed, comparing them to the commercial catalysts. The results are set forth in Tables 7 and 8. The difference between Tables 7 and 8 is that in Table 7 the HDS rate constant, K$_{HDS}$, is a 1.5th order rate constant and in Table 8, the HDS rate constant is second order. The activities of the various catalysts were determined by varying the space velocity (LHSV) in order to determine the HDS reaction rate constant (K$_{HDS}$). The results of these experiments showed that for some catalysts the HDS rate constant was second order while for other it was 1.5 order. The HDS rate constant K$_{KDS}$ was calculated using a least squares method passing through the origin on a plot of $$\left(\frac{S_f}{S_p}\right)^{n-1} - 1$$

as the ordinate and reciprocal of the space velocity as the abscissa, according to the following equation:

$$\left(\frac{S_f}{S_p}\right)^{n-1} - 1 = (n-1) K_{HDS} \frac{(S_f)^{n-1}}{LHSV}$$

wherein S$_f$ and S$_p$ are the wt. % of sulfur in the feed and product, respectively and wherein n is the order of the HDS reaction (n=2 for second order and 1.5 for 1.5th order).

Similarly, the HDN rate constant, K$_{HDN}$, which is a first order rate constant for al the catalysts, was also plotted using a least squares method passing through the origin on a semi-logarithmic plot of N$_f$/N$_p$ as the logarithmic ordinate and reciprocal of the space velocity as the abscissa, according to the following equation:

$$\frac{K_{HDN}}{LHSV} = \ln\left(\frac{N_f}{N_p}\right)$$

wherein N$_f$ and N$_p$ are the wt. % of nitrogen in the feed and process, respectively.

The results are set forth in Tables 7 and 8. It should be noted that a 1.5th order of kinetics was used for the correlation (correlation coefficient of 0.963) of the HDS data obtained from the commercial catalyst in Table 7 in order to obtain a convenient basis for comparison, even though a second order kinetics fit the data slightly better (correlation coefficient=0.975). This treatment does not affect in any way the relative activity ranking for the catalysts set forth in Table 7. All it does is to give a somewhat more conservative comparison between the commercial catalysts and the catalysts useful in the proeces of the invention.

TABLE 6

| LCCO Feed | |
|---|---|
| Gravity (°API) | 18.6 |
| Sulfur, wt. % | 1.5 |
| Nitrogen, ppm | 370 |

| GC Distillation | |
|---|---|
| Wt. % | Temp., °C. |
| 5 | 231 |
| 10 | 251 |
| 50 | 293 |
| 70 | 321 |
| 90 | 352 |
| 95 | 364 |

TABLE 7

HDN and HDS Activities of Catalysts

| Example | | K$_{HDN}$ | K$_{HDS}$ | HDN Selectivity* |
|---|---|---|---|---|
| | Commercial Catalyst | | | |
| Control | Cobalt molybdate on $\gamma$-Al$_2$O$_3$ | 0.6 | 6.8 | 11.22 |
| Control | Nickel molybdate on $\gamma$-Al$_2$O$_3$ | 1.3 | 6.24 | 27.82 |
| | Catalyst Precursor | | | |
| 20 | Co(en)$_3$MoS$_4$ | 4.1 | 12.1 | 34.0 |
| 21 | Ni(en)$_3$MoS$_4$ | 6.7 | 11.4 | 58.4 |
| 22 | Ni(en)$_3$WS$_4$ | 4.3 | 12.9 | 33.3 |
| 23 | Co(en)$_3$WS$_4$ | 2.4 | 7.1 | 33.9 |

*$\frac{K_{HDN}}{K_{HDS}} \times 10^2$

TABLE 8

HDN and HDS Activities of Catalysts

| Example | | K$_{HDN}$ | K$_{HDS}$ | HDN Selectivity* |
|---|---|---|---|---|
| | Commercial Catalyst | | | |
| Control | Cobalt molybdate on $\gamma$-Al$_2$O$_3$ | 0.6 | 10.7 | 5.1 |
| Control | Nickel molybdate on $\gamma$-Al$_2$O$_3$ | 1.3 | 9.9 | 12.7 |
| 24 | Catalyst Precursor Zn$_{0.7}$Ni$_{0.3}$(en)$_3$MoS$_4$ | 2.9 | 6.5 | 42.8 |

*$\frac{K_{HDN}}{K_{HDS}} \times 10^2$

EXAMPLE 25

This experiment demonstrates the effectiveness of the catalysts of this invention for hydrodenitrogenation and was similar to that of Examples 1–3 using the same reactor, start-up procedure, etc. except that the DBT/Decalin feed contained 0.835 cc of quinoline. Analysis of the feed gave the sulfur content as 8,529 ppm and a nitrogen content of 0.1%. The catalyst used was formed from Ni(en)$_3$MoS$_4$ using the procedure in Examples 1–3. The temperature and pressure in the reactor were 350° C. and 450 psi of hydrogen at a hydrogen flow rate of about 100 STD cc/min.

After four hours a sample was removed from the reactor, analyzed and found to have 0.63% of sulfur and 0.038% nitrogen. After a total of eight hours, the sulfur content was 3,088 ppm and the nitrogen content was 0.02%.

This experiment was repeated using a one gram sample of a commercial nickel molybdate on gamma alumina catalyst. After a first run of eight hours, the reactor was drained and filled with a fresh 100 cc sample of feed. After four more hours with the fresh feed a sample was removed and found to have sulfur and nitrogen contents of 6,382 ppm and 0.083%, respectively.

EXAMPLE 26

This experiment was a repeat of that of Example 25 and, in fact, used the same batch of catalyst formed from the Ni(en)$_3$MoS$_4$ which had been left in the reactor. The feed analysis was 8,440 ppm of sulfur and 0.11% nitrogen. After sixteen hours in the reactor a sample was withdrawn and found to have a sulfur content of 339 ppm and a nitrogen content of less than 0.02%.

SUPPORTED CATALYST SPECIES

EXAMPLE 28

Catalyst A: (Ni(en)$_3$MoS$_4$/SiO$_2$

The following solutions were prepared: Solution I, 67.8 g of colloidal SiO$_2$ (34 wt. % SiO$_2$ in H$_2$O) in 400 cc H$_2$O; solution II, 24.9 g of NiCl$_2$.6H$_2$O plus 34.6 g of ethylenediamine in 75 cc H$_2$O, and solution III, 50 g of (NH$_4$)$_2$MoS$_4$ in 100 cc/H$_2$O-plus-50 cc ethylenediamine. Solution I was placed in a 2000 cc flask. With constant agitation, solution II was added to solution I dropwise via a separatory funnel. A purple gel formed. To the resulting gel was added solution III in the same manner as described above. An orange-red precipitate was formed, characteristic of Ni(en)$_3$MoS$_4$. The precipitate was recovered by vacuum filtration through a Buchner funnel. The resulting cake, after drying under vacuum at 50° C. for 16–20 hours, was ground and granulated (20/40 mesh) by pelletizing with a 4% polyvinyl alcohol solution. Prior to the catalyst activity test, the catalyst precursor composite of silica and precursor salt was sulfided with a 10% H$_2$S—in—H$_2$ mixture at 325° C. for three hours.

EXAMPLE 29

Catalyst B: Ni(en)$_3$MoS$_4$/Al$_2$O$_3$

The same procedure as that described in Example 28 was used for this catalyst, except that 97.82 g of colloidal Al$_2$O$_3$(20 wt. % of Al$_2$O$_3$ in H$_2$O) was used instead of colloidal silica.

EXAMPLE 30

Catalyst C: Ni(en)$_3$MoS$_4$/Fe$_2$O$_3$

The same precedure as that described in Example 28 was used for this catalyst, except that in Solution I, 292.0 g of colloidal Fe$_2$O$_3$ (10 wt. % Fe$_2$O$_3$) in H$_2$) was added to 600 cc H$_2$O.

EXAMPLE 31

Catalyst D: Ni(en)$_3$MoS$_4$/Al$_2$O$_3$

The same precedure as that used in Example 29 was used except that Solution 1 contained 79.6 g colloidal alumina. Solution II contained 24.7 g NiCl$_2$.6H$_2$O, and Solution III contained 27.0 g (NH$_4$)$_2$MoS$_4$.

EXAMPLE 32

Catalyst F: Ni(en)$_3$WS$_4$/Al$_2$O$_3$

The following solutions were prepared: Solution I, 17.9 g colloidal alumina (20 wt. % Al$_2$O$_3$ in H$_2$O) in 350 ml H$_2$O; solution II, 33.3 g NiCl$_2$.6H$_2$O in 150 ml water, plus 50 ml ethylenediamine, and solution III: 48.7 g (NH$_4$)$_2$WS$_4$ in 100 ml water, plus 50 ml ethylenediamine. Solution I was placed in a 200 ml flask. With constant agitation, solution II was added to solution I dropwise. A purple gel formed, which remained fluidized under constant stirring. Solution III was added dropwise to the gel, with stirring. A yelow precipitate formed, the characteristic color of Ni(en)$_3$WS$_4$. The precipitate was recovered by vacuum filtration, and dried under vacuum at 50° C. for 16–20 hours. The dry powder was ground and granulated by pelletizing with 4% polyvinylalcohol binder.

The catalyst precursor composite was sulfided in the same manner as described in Example 28.

EXAMPLE 33

Catalyst G: Ni(en)$_3$WS$_4$/Al$_2$O$_3$

The same procedure as that described in Example 32 was used, except that Solution I contained 33.7 g colloidal alumina, Solution II contained 31.4 g NiCl$_2$.6H$_2$O, and Solution III contained 46.0 g (NH$_4$)$_2$WS$_4$.

EXAMPLE 34

Catalyst H: Ni(en)$_3$WS$_4$/Al$_2$O$_3$

The same procedure as that described in Example 32 was used except that Solution I contained 79.6 colloidal alumina, Solution II contained 24.7 g NiCl$_2$.6H$_2$O, and Solution III contained 36.2 g (NH$_4$)$_2$WS$_4$.

EXAMPLE 35

Catalyst I: Ni(en)$_3$WS$_4$/Al$_2$O$_3$

The same procedure as that described in Example 32 was used except that Solution I contained 120.9 colloidal alumina, Solution II contained 18.8 g NiCl$_2$.6H$_2$O, and Solution III contained 27.5 g (NH$_4$)$_2$WS$_4$.

EXAMPLE 36

Catalyst J: Ni(en)$_3$WS$_4$/Al$_2$O$_3$

The same procedure as that described in Example 35 was used, except that Solution III was added to Solution I to give a yellow gel, and then Solution II was added to the gel to give a yellow precipitate.

EXAMPLE 37

Catalyst L: Ni(en)$_3$MoS$_4$/Al$_2$O$_3$

The following solutions were prepared: Solution I, 25.42 g of (NH$_4$)$_6$Mo$_7$O$_{24}$.2H$_2$O dissolved in 200 cc H$_2$O/100 cc NH$_4$OH; solution II, 18.67 g of NiCl$_2$.6H$_2$O dissolved in 50 g H$_2$O, and solution III, 120 g of colloidal Al$_2$O$_3$ (20 wt. % Al$_2$O$_3$ in H$_2$O). Solution III was added to Solution I to form a white liquid suspension. 25.96 g of ethylenediamine was added to Solution II to form solution IV. H$_2$S was bubbled through the white liquid suspension at about 60 cc/min and solution IV was slowly added at subroom temperature. An orange-red precipitate formed.

The precipitate was recovered by vacuum filtration and then purified with distilled water and ethanol. The thus-purified catalyst precursor composite was ground and granulated into 20/40 mesh. Prior to the activity test, the catalyst precursor composite was sulfided with a 10% $H_2S$—in—$H_2$ mixture at 325° C. for three hours.

TABLE 9

Hydrotreating Results of Supported Ni Catalysts

| Example | Catalyst | Mo or W | Support | % HDN | % HDS | 1st Order $K_{HDN}$ | 1.5 Order $K_{HDS}$ | HDN Selectivity $K_{HDN}/K_{HDS} \times 10^2$ |
|---|---|---|---|---|---|---|---|---|
| Control | $CoMoAl_2O_3$* | Mo | $Al_2O_3$ | 19.0 | 83.6 | 0.63 | 7.20 | 8.8 |
| Control | $NiMoA_2O_3$* | Mo | $Al_2O_3$ | 35.0 | 84.7 | 1.29 | 7.63 | 16.9 |
| 28 | A | Mo | $SiO_2$ | 74.0 | 82 | 4.04 | 6.65 | 60.8 |
| 29 | B | Mo | $Al_2O_3$ | 39.0 | 69.3 | 1.48 | 3.94 | 37.6 |
| 30 | C | Mo | $Fe_2O_3$ | 18.0 | 41.2 | 0.60 | 1.49 | 39.9 |
| 31 | D | Mo | $Al_2O_3$ | 38.6 | 70.7 | 1.46 | 4.15 | 35.3 |
| 32 | F | W | $Al_2O_3$ | 78.9 | 89.5 | 4.67 | 10.22 | 45.7 |
| 33 | G | W | $Al_2O_3$ | 71.4 | 85.1 | 3.78 | 7.79 | 48.2 |
| 34 | H | W | $Al_2O_3$ | 54.4 | 77.4 | 2.36 | 5.41 | 43.6 |
| 35 | I | W | $Al_2O_3$ | 40.1 | 71.4 | 1.54 | 4.26 | 36.1 |
| 36 | J | W | $Al_2O_3$ | 55.1 | 79.0 | 2.40 | 5.79 | 41.5 |
| 37 | L | Mo | $Al_2O_3$ | 37.0 | 70.6 | 1.39 | 4.14 | 33.5 |

*Commercial cobalt molybdate and nickel molybdate catalysts used in Examples 20-24.

What is claimed is:

1. As a composition of matter, a bulk, unsupported hydroprocessing catalyst obtained by heating one or more sulfur-containing salts at elevated temperature of at least about 200° C. up to about 600° C. and under oxygen-free conditions for a time sufficient to form said catalyst, wherein said sulfur-containing salt is of the general formula (ML) $(Mo_yW_{1-y}S_4)$ wherein M is one or more promoter metals selected from the group consisting of Ni, Co, Zn, Cu and mixture thereof, wherein y is any value ranging from 0 to 1 and wherein L is one or more neutral, nitrogen-containing ligands, at least one of which is a chelating polydentate ligand.

2. The catalyst of claim 1 wherein said heating is conducted in the presence of a sulfur-bearing compound in addition to said sulfur-containing salt.

3. The catalyst of claim 2 containing at least two of said promoter metals.

4. The catalyst of either of claims 2 or 3 wherein said ligand is selected from the group consisting of alkyl amines, aryl amines, nitrogen heterocycles and mixtures thereof.

5. The catalyst of claim 4 wherein said ligand comprises an alkyl amine.

6. The catalyst of claim 5 wherein said heating is conducted in the presence of a mixture of $H_2$ and $H_2S$.

7. The catalyst of claim 6 wherein M is selected from the group consisting of Co, Ni and mixtures thereof.

8. A process for preparing a hydroprocessing catalyst, said process consisting essentially of heating one or more sulfur-containing salts at elevated temperature of at least about 200° C. up to about 600° C. and under oxygen-free conditions for a time sufficient to form said catalyst, wherein said sulfur-containing salt is of the formula (ML) $(Mo_yW_{1-y}S_4)$ wherein M comprises one or more divalent promoter metals selected from the group consisting of divalent Ni, Co, Zn, Cu and mixture thereof, wherein Y is any value ranging from 0 to 1 and wherein L is one or more neutral, nitrogen-containing polydentate ligands, at least one of which is a chelating polydentate ligand.

9. The process of claim 8 wherein said heating is conducted in the presence of a sulfur-bearing compound in addition to said sulfur-containing precursor salt.

10. The process of claim 9 containing at least two of said promoter metals.

11. The process of either of claims 9 or 10 wherein said ligand is selected from the group consisting of alkyl amines, aryl amines, nitrogen heterocycles and mixtures thereof.

12. The process of claim 11 wherein said ligand comprises an alkyl amine.

13. The process of claim 12 wherein said non-oxidizing atmosphere comprises a mixture of $H_2$ and $H_2S$.

14. The process of claim 8 wherein M is selected from the group consisting of Co, Ni and mixtures thereof.

15. The process of claim 14 wherein said ligand L has a denticity of six and is either three bidentate or two tridentate chelating ligands.

* * * * *